UNITED STATES PATENT OFFICE.

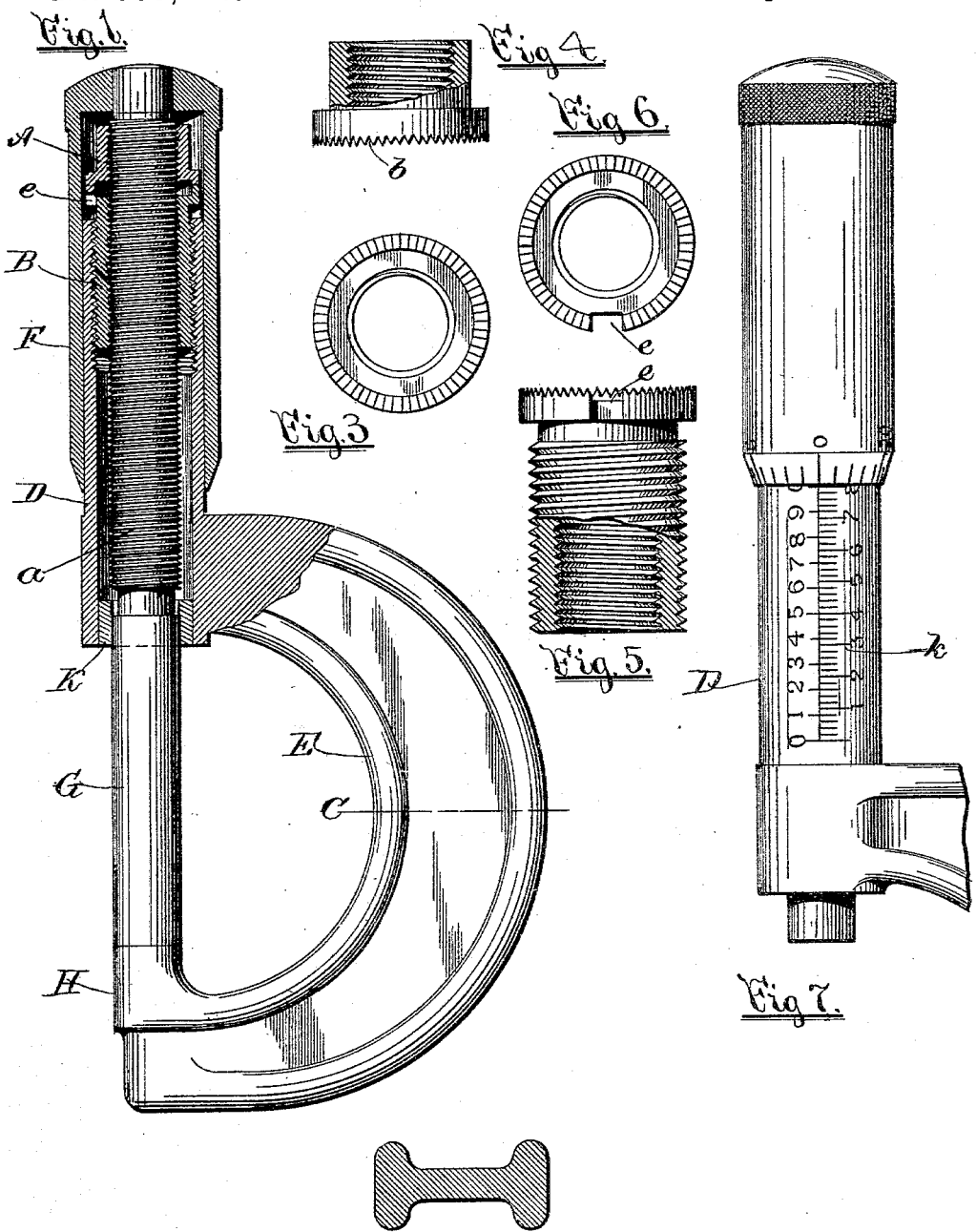

JOHN T. SLOCOMB, OF PROVIDENCE, RHODE ISLAND, ASSIGNOR TO J. T. SLOCOMB & CO., OF SAME PLACE.

MICROMETER-GAGE.

SPECIFICATION forming part of Letters Patent No. 559,820, dated May 12, 1896.

Application filed November 19, 1894. Serial No. 529,338. (No model.)

*To all whom it may concern:*

Be it known that I, JOHN T. SLOCOMB, a citizen of the United States, residing at Providence, in the county of Providence and State of Rhode Island, have invented a new and useful Improvement in Micrometer-Gages, of which the following is a specification.

My invention is for the purpose of improving the common micrometer-gages in the following ways: first, to provide a better means of adjustment for wear in the micrometer-screw than has before been known and to insure at all times that the threads of screw and nut have a bearing on their working sides; second, to provide a better means of adjustment for wear upon the measuring-terminals than has before been known; third, to provide a more convenient means of setting a micrometer-gage, graduated to read in decimals, to eighth divisions of an inch, and, fourth, to form the bow or frame so as to provide a convenient finger-hold and at the same time have greater strength for its weight. I attain these objects by the means illustrated in the accompanying drawings, in which—

Figure 1 is a longitudinal view of my new tool with the thimble end shown in section; Fig. 2, a cross-section on line C of Fig. 1. Figs. 3 and 4 are enlarged detail views of the compensating nut A in Fig. 1. Figs. 5 and 6 are enlarged detail views of main nut B in Fig. 1. Fig. 7 is an exterior view, without shading, of the part shown in section in Fig. 1, showing my improvement in the linear graduating of the barrel D.

Similar letters refer to same parts throughout the several views.

In Fig. 1, E is what I term the "bow" or "frame" of the tool; F, the thimble; D, the barrel; G, the micrometer-spindle, with micrometer-screw at $a$; B, the main nut; A, the compensating nut; H, the anvil; K, the spindle-bushing.

The barrel D has a cylindrical bore extending throughout its length, concentric with the spindle G and parallel with it. The right end of the bore of the barrel D is internally threaded to fit tightly the external threads of the main nut B, while the left end fits tightly over the cylindrical bushing K.

To the right end of micrometer-screw, to the right of main nut B, the compensating nut A is fitted, so as to allow the screw to turn freely through it, but prevented from turning and also from end motion toward the left end of tool by teeth upon its face, which engage similar-shaped teeth on the face of main nut B.

The teeth on faces of compensating nut A and main nut B are shown at $b$ in Fig. 4 and at $c$ in Fig. 5. The faces of these two nuts are clutched together while in use, so as to act together as a solid nut, except that they are adjusted in the teeth so as to draw apart, thus compensating for wear in the threads. Figs. 3, 4, 5, and 6 are drawn on a much larger scale and with fewer teeth than are used in practice. In practice there are fifty (50) teeth cut upon the face of each nut, so as to fit each other and interchange anywhere by fiftieths throughout a whole revolution. The pitch of micrometer-screw being forty, or .025 of an inch to a turn, it will be seen that rotating nut A upon nut B one tooth, or one-fiftieth of a revolution, an end looseness of one two-thousandth of an inch of these nuts on the micrometer-screw would be eliminated. In order to rotate one of these nuts upon the other, the micrometer-screw must be removed from one or both nuts, it being a simple matter to turn the micrometer-screw back out of main nut B, so as to allow of nut A being rotated a sufficient number of teeth to eliminate whatever looseness there may be in the threads. Main nut B will take the whole thrust due to the pressure of measuring, nut A being simply for the purpose of eliminating the end looseness of micrometer-screw due to wear or in the original fitting. This arrangement allows of making an adjustable nut without longitudinal splits, which are objectionable on account of allowing dirt to enter the threads and also as they cause the nut to be less rigid. It also allows of making the adjustment in the direction of the wear, thereby keeping the same wearing-surfaces in contact, which is not the case where the nut is contracted upon the screw in a direction at right angles to it, as is common.

Besides the means of adjustment for end looseness of the micrometer-screw in a gage of this kind there must be means of adjustment to make the zero-lines of thimble and barrel match when the end of spindle is brought in contact with the face of anvil. This adjustment is used in the original fitting of the tool and afterward to compensate for wear. This is commonly done by means of an adjustable anvil-screw; but where the anvil is made the same diameter as end of spindle, as shown, a very small and weak screw is required. In order to obtain greater strength against accidental injury, I prefer to make the anvil solid with the frame, which is of steel, allowing the anvil to be hardened as well as though it were inserted. The adjusting-screw being dispensed with at the anvil, I make this adjustment by bringing the spindle itself down, without revolving it, in the following way: The main nut B (shown on a large scale and partly in section, Fig. 5) is internally threaded to forty pitch to fit micrometer-screw and externally threaded to thirty-two pitch to fit tightly the internal thread in barrel D. In ordinary use this nut is not disturbed, but being a tight fit in barrel D remains rigidly in place as though it were a part of barrel D; but when it is required to adjust the end location of the spindle on account of wear (which in other tools is done with the anvil-screw) this nut is turned slightly by the use of a little spanner-wrench which accompanies each tool and is made to fit the notch e. On account of there being a difference in the pitches of the external and internal threads of main nut B of six and one-fourth thousandths of an inch per turn, if the spindle is prevented from turning while the nut B is revolved upon it and into the barrel D, the spindle will be advanced just this six and one-fourth thousandths per turn of nut B. It will be understood that in order to turn nut B the spindle must be turned back till the edge of thimble F has passed beyond this nut and so exposes it to view. As the adjustments required here are very small, often less than one four-thousandth of an inch, this differential screw adjustment is of considerable importance, for it allows of considerable movement of nut B to adjust one four-thousandth of an inch.

My improvement in the linear graduating of barrel D (shown in Fig. 7) consists in extending every fifth cross-line below the parallel zero-line, as shown at k, the graduating and numbering otherwise being the same as is common on a micrometer-gage with forty-pitch screw graduated to read in thousandths of an inch. As every fifth line in this case represents eighth divisions of an inch, by extending them on the lower side and properly numbering them from "1" to "8," as shown, the tool can be readily set by eighths of an inch without calculation, and at the same time there is no interference with reading the tool in the ordinary way.

Micrometer-gages have formerly been made with the bows of a rectangular form of section, which provides a slippery finger-hold and often requires a grip that interferes with feeling in a sensitive way.

My improvement consists in making the section I-shaped in form, which allows of a suitable finger-hold and at the same time lightens the tool somewhat.

What I claim as my invention, and wish to secure by Letters Patent, is—

1. In combination with other parts in a micrometer-gage, of an adjustable nut, composed of two parts, each internally threaded to fit the micrometer-screw and adapted to adjust for end looseness on the threads of screw by rotating one part upon the other, with their faces in contact.

2. In combination with other parts in a micrometer-gage, of an adjustable nut, composed of two parts, each internally threaded to fit micrometer-screw and each provided with teeth on one of its faces adapted to engage the similar teeth on the face of the other, for the purpose described.

3. The combination in a micrometer-gage of two nuts fitted to the micrometer-screw; one adapted to receive the back thrust of screw, the other to receive the forward thrust, and adapted to adjust for end looseness in the threads by being forced apart.

4. In combination with other parts in a micrometer-gage, of a main solid nut, adapted to receive the back thrust of micrometer-screw, and provided with an external thread of a pitch different from its internal thread, adapted to adjust the end location of micrometer-screw by the difference in the pitches between the internal and external threads, substantially as shown and described.

5. In a micrometer-gage, the combination of a thimble attached concentrically with the micrometer-screw, having upon one of its ends a single scale of circumferential graduations adapted to indicate whole or portions of revolutions from a single revolution line cut upon an adjoining stationary part, and a scale of linear graduations adjoining said revolution line, the units of said linear scale corresponding with the pitch of micrometer-screw and having certain multiples of said unit lines extended across revolution line and suitably numbered while certain other multiples of said unit lines are extended and numbered on the opposite side, substantially as shown and described and for the purpose set forth.

JOHN T. SLOCOMB.

Witnesses:
THOMAS TIERNEY,
CHAS. E. BARLOW.